US009016155B2

(12) United States Patent
Pittini et al.

(10) Patent No.: US 9,016,155 B2
(45) Date of Patent: Apr. 28, 2015

(54) POWER TRANSMISSION UNIT FOR AN ELECTROMOTIVELY OPERATED DRIVE AND MAGNETO-RHEOLOGICAL CLUTCH

(71) Applicant: Maxon Motor AG, Sachseln (CH)

(72) Inventors: Raniero Pittini, Hergiswil (CH); Max Erick Busse-Grawitz, Alpnach Dorf (CH)

(73) Assignee: Maxon Motor AG, Sachseln (CH)

( * ) Notice: Subject to any disclaimer, the term of this patent is extended or adjusted under 35 U.S.C. 154(b) by 135 days.

(21) Appl. No.: 13/658,179

(22) Filed: Oct. 23, 2012

(65) Prior Publication Data

US 2013/0098187 A1  Apr. 25, 2013

(30) Foreign Application Priority Data

Oct. 24, 2011  (DE) .......................... 10 2011 116 783

(51) Int. Cl.
F16D 27/00   (2006.01)
F16H 3/08    (2006.01)
F16D 37/02   (2006.01)
F16D 37/00   (2006.01)

(52) U.S. Cl.
CPC .......... *F16D 37/02* (2013.01); *F16D 2037/007* (2013.01)

(58) Field of Classification Search
USPC ................ 74/331, 377, 664, 665 R; 192/21.5
See application file for complete search history.

(56) References Cited

U.S. PATENT DOCUMENTS

| 2,760,739 A | 8/1956 | Reichert |
| 2,872,002 A | 2/1959 | Ott-Heinrich |
| 2,892,356 A * | 6/1959 | Sinclair ........................... 74/361 |
| 3,363,732 A | 1/1968 | Nakamura et al. |
| 4,286,479 A * | 9/1981 | Baumann et al. ............... 74/724 |
| 5,598,908 A * | 2/1997 | York et al. ................... 192/21.5 |
| 5,779,013 A | 7/1998 | Bansbach |

(Continued)

FOREIGN PATENT DOCUMENTS

| DE | 927058 | 4/1955 |
| DE | 3128959 A1 | 4/1982 |
| DE | 112008001271 T5 | 3/2010 |
| WO | WO 2004-018889 A1 | 3/2004 |
| WO | WO 2009/117827 A1 | 10/2009 |

OTHER PUBLICATIONS

German Novelty Search Report and the English Translation of Relevant Parts of the German Novelty Search Report dated Oct. 16, 2013 corresponding to German Patent Application No. 2009681 (9pgs).

(Continued)

*Primary Examiner* — Ha D Ho
(74) *Attorney, Agent, or Firm* — Buchanan Ingersoll & Rooney PC

(57) ABSTRACT

A power transmission unit includes a first input shaft and a second input shaft which can be mutually driven by a motor shaft in opposite directions. A driven shaft can be coupled, depending on the desired sense of rotation of the driven shaft, to the first or to the second input shaft, and can engage with a first output shaft and with a second output shaft. The first output shaft can be directly coupled with the first input shaft via a first magneto-rheological clutch, and the second output shaft can be directly coupled with the second input shaft via a second magneto-rheological clutch. A magneto-rheological clutch includes a coil powered by wireless energy transmission between a sender connected to a stationary housing and a receiver rotating with the coil.

13 Claims, 4 Drawing Sheets

(56) References Cited

U.S. PATENT DOCUMENTS

Figure 1:
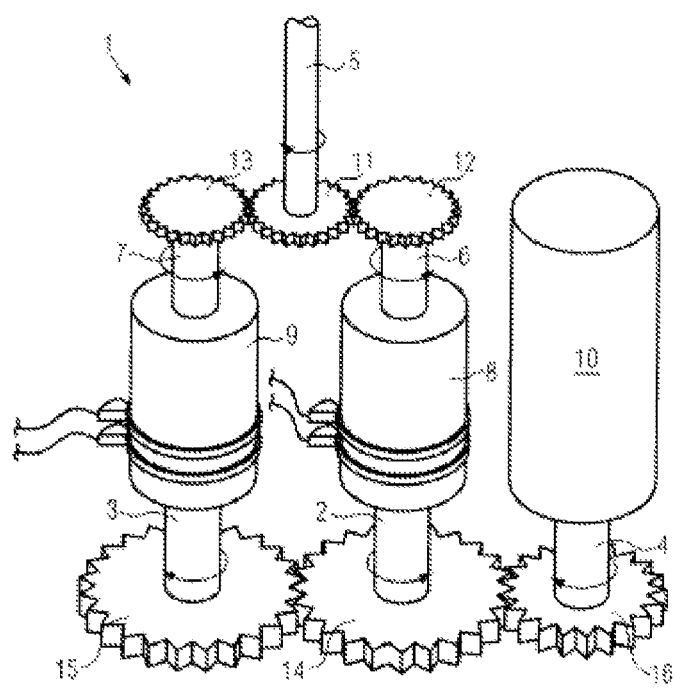

| | | |
|---|---|---|
| 6,183,386 B1 | 2/2001 | Duggan |
| 6,269,924 B1 | 8/2001 | Sugimoto et al. |
| 6,585,616 B1 | 7/2003 | Robinson |
| 7,999,429 B2 | 8/2011 | Ogawa et al. |
| 2006/0052198 A1 | 3/2006 | Namuduri et al. |
| 2008/0202285 A1* | 8/2008 | Pedrazzini-Bertolazzi .... 74/664 |
| 2011/0045932 A1 | 2/2011 | Fautoux et al. |

OTHER PUBLICATIONS

English Translation of Written Opinion of German Patent Application No. 2009681 (4 pgs), (Filed Dec. 31, 2013).

Dutch Novelty Search Report dated Nov. 12, 2013 (5 pgs).

* cited by examiner

POWER TRANSMISSION UNIT FOR AN ELECTROMOTIVELY OPERATED DRIVE AND MAGNETO-RHEOLOGICAL CLUTCH

The present disclosure relates to a power transmission unit for an electromotively operated drive. Such a power transmission unit comprises a first input shaft and a second input shaft, where the first and the second input shafts can be driven together by a motor shaft in opposite directions. Furthermore, the power transmission unit comprises a driven shaft that can be coupled to the first or to the second input shaft, depending on the desired sense of rotation of the driven shaft.

Such power transmission units for electromotive drives are known from prior art. They are mainly employed for providing drives with high torques, wherein the driven shaft can be accelerated or decelerated extremely quickly, or even a quick change of the sense of rotation of the driven shaft can be achieved. Electromotive drives with a generic power transmission unit are employed, for example, in robotics.

A power transmission unit of the type mentioned in the beginning is known, for example, from WO 2009/117827 A1. The power transmission unit is realized there by means of two planetary differentials and two magneto-rheological brakes. By a continuously rotating motor shaft, first two input shafts of the power transmission unit are rotated in opposite directions via a transmission. The two input shafts rotate at the same speed. The first input shaft comprises the sun wheel of a first planetary differential, the second input shaft comprises the sun wheel of the second planetary differential of the power transmission unit. Both planetary differentials share a common planet carrier, where the planetary wheels of the first planetary differential mounted in the planet carrier can rotate independently of the planetary wheels of the second planetary differential. The common planet carrier of the two planetary differentials at the same time forms the driven shaft of the power transmission unit. Each planetary differential furthermore comprises a ring gear, wherein the two ring gears can rotate independently of each other. When the drive is running idle, the planet carrier is standing still, while the two ring gears rotate in opposite directions at the same rotational speed. If now one of the two ring gears is stopped, the planet carrier and thus the driven shaft of the power transmission unit are rotated. The driven shaft is thus indirectly coupled with one of the two input shafts of the power transmission unit via the respective planetary differential. To be able to stop the ring gears of the two planetary differentials, two magneto-rheological brakes are provided. Each brake comprises two engaging lamellar structures, one of them each being connected with one of the two ring gears, while the other one is connected to a stationary housing of the power transmission unit. By means of the two magneto-rheological brakes, the two ring gears can be alternatingly or simultaneously decelerated or stopped in a regulated manner. This permits to very quickly accelerate or decelerate the driven shaft of the power transmission unit or to even cause a change of the sense of rotation of the driven shaft.

In particular by the coaxial arrangement of the two input shafts of the power transmission unit rotating in opposite directions and being fitted into each other, and due to the two required planetary differentials, the structure of the power transmission unit known from WO 2009/117827 A1 is relatively complicated, resulting in an elaborate and therefore expensive manufacture of the power transmission unit.

Also from DE 3128959 A1, a power transmission unit of the type mentioned in the beginning is known in which the torque transmission from the two input shafts to the driven shaft alternatively takes place via two electro-rheological clutches. Torque transmission can moreover be controlled by applying current to the two clutches. It showed, however, that the power transmission unit known from DE 3128959 A1 is not suited for some applications. In some cases, problems arise in view of service life, power transmission, control and costs.

It is therefore an object of the present invention to provide an alternative power transmission unit of the type mentioned in the beginning which has a simple construction and is inexpensive to manufacture. The power transmission unit should moreover have a long-life, be easy to control and inexpensive in running operation. Moreover, it should be possible to transmit high torques.

Accordingly, the object is achieved according to the invention if the driven shaft is engaged with a first output shaft and with a second output shaft, wherein the first output shaft can be directly coupled with the first input shaft via a first magneto-rheological clutch between the first input shaft and the first output shaft, and the second output shaft can be directly coupled with the second input shaft via a second magneto-rheological clutch between the second input shaft and the second output shaft. Instead of magneto-rheological brakes, magneto-rheological clutches are accordingly employed in the invention. So to speak, two drive trains branch off from the continuously rotating motor shaft which can be alternatively engaged, by means of the two magneto-rheological clutches, with the driven shaft of the power transmission unit so as to be entrained. Each drive train comprises one input shaft and one output shaft which can be coupled each by means of a magneto-rheological clutch in a torque-proof manner. The invention basically also permits a complex structure of the power transmission unit, for example by coaxial arrangement of the two drive trains. For example, the first input shaft and the first output shaft could be designed as hollow shafts within which the second input shaft and the second output shaft are rotatably arranged. This would permit a similarly compact structure as in the power transmission unit known from WO 2009/117827 A1. However, the invention also permits a far simpler structure of the power transmission unit as the two drive trains do not have to be arranged coaxially with respect to each other and can be designed without differential. The power transmission unit according to the invention can therefore be manufactured much more easily and at lower costs. The power transmission unit according to the invention moreover has a long life, can be easily controlled and permits the transmission of very high torques. It is moreover relatively cheap in running operation. It is pointed out that the two input shafts can also be driven, instead of by a common motor, by two separate electric motors in opposite directions.

Further advantageous embodiments of the invention are the subject matter of the subclaims.

A particularly simple construction of the power transmission unit according to the invention results if the first input shaft and the second input shaft are arranged in parallel, the first output shaft being arranged coaxially to the first input shaft, and the second output shaft being arranged coaxially to the second input shaft. Each of the two drive trains consisting of an input shaft and an output shaft therefore has a straight extension, meaning a simple design of the magneto-rheological clutch between the input shaft and the output shaft.

In another preferred embodiment of the present invention, the engagement of the driven shaft with the first and the second output shafts is realized via gearwheels, a gearwheel of the driven shaft, in the manner of a spur gear, simultaneously meshing with a gearwheel of the first output shaft and with a gearwheel of the second output shaft. The mentioned gearwheels are here each firmly connected with the respective shafts. This embodiment permits an extremely inexpensive engagement of the driven shaft with the first and the second output shafts that can be easily realized.

In a further particularly preferred embodiment of the present invention, a gearwheel of the first input shaft meshes, in the manner of a spur gear, with a gearwheel of the second input shaft, so that the first input shaft and the second input shaft rotate in opposite directions. Here, too, the mentioned gearwheels are again firmly connected to the respective shafts. The opposite sense of rotation of the two input shafts can be thus realized in a simple manner.

The drive of the two input shafts is here preferably realized by a gearwheel of the motor shaft being engaged either with the gearwheel of the first input shaft or with the gearwheel of the second input shaft so as to be entrained. Thus, for example the motor for driving the power transmission unit can be arranged next to the two drive trains of the power transmission unit. This permits a compact design of the complete electromotively operated drive in the axial direction. As an alternative, one of the two input shafts can also be driven directly by the motor. The motor shaft is here directly connected to one of the two input shafts.

In another preferred embodiment of the present invention, a step-up or step-down gear is realized between the motor shaft and the driven shaft by different gear rim diameters of the gearwheels in engagement. By this, for example high torques can be generated even with low engine outputs, or a desired rotational speed of the driven shaft of the power transmission unit can be adjusted.

In another preferred embodiment of the present invention, the first and the second magneto-rheological clutches each comprise a coil rotating along for creating the required magnetic field, the power supply of the coil being realized by means of a sliding contact between a stationary housing and the shaft which the coil is rotating along with. To close the magneto-rheological clutch, a magnetic field must be created for which a coil is normally used. The coil usually rotates along with the drive shaft, so in the present case with one of the input shafts, but it can also rotate along with the driven shaft, so in the present case with one of the two output shafts. To be able to supply the coil with power, current transmission must take place from the stationary housing of the power transmission unit to the shaft on which the coil for creating the magnetic field is located.

This can be realized easily and inexpensively, for example, by a sliding contact as it is also employed, for example, in electric brush-type motors.

In another preferred embodiment of the present invention, the first and the second magneto-rheological clutches comprise one stationary coil each for creating the required magnetic field. This has the advantage that no current transmission must take place between the stationary housing and the rotating shaft. This embodiment is particularly inexpensive.

In another preferred embodiment of the present invention, the power transmission unit furthermore comprises a high-resolution actual value transmitter, in particular a shaft encoder and/or a speedometer and/or an accelerometer by means of which the position of the driven shaft is detected. Thus, the driven shaft can be position-controlled.

In another preferred embodiment of the present invention, for applying current to the coils of the magneto-rheological clutches, a current control is provided. By this, the torque applied to the driven shaft can be controlled depending on the set current. By this, moreover quicker reaction times of the clutches are achieved.

The invention furthermore relates to a magneto-rheological clutch between two shafts, the magneto-rheological clutch comprising a coil for generating the required magnetic field which is arranged on one of the two shafts in a torque-proof manner. The sliding contact for power supply already mentioned above is known, for example, from WO 2004/018889 A1.

Sliding contact, however, always involves a negative influence on the efficiency of the overall system as frictional losses occur by the sliding contact. Furthermore, any kind of sliding contact causes certain wear, whereby the service life of the magneto-rheological clutch is limited or routine maintenance or a regular exchange of the brushes is required.

It is therefore also an object of the present invention to provide a magneto-rheological clutch of the type mentioned above which must be serviced only rarely and has a longer service life. Moreover, as little frictional losses as possible should occur between the rotating shaft and the stationary housing.

According to the invention, this is achieved by the power supply of the coil being realized by means of wireless energy transmission between a sender connected to a stationary housing and a receiver rotating along with the coil. By the magneto-rheological clutch according to the invention, the above mentioned desired advantages are achieved. The sliding contact is eliminated, whereby frictional losses between the rotating shafts and the stationary housing are only caused by the bearing of the shafts. At least the energy transmission between the housing and the rotating shaft is maintenance-free.

The magneto-rheological clutch according to the invention can be preferably employed in the power transmission unit according to the invention for an electromotively operated drive.

In a preferred embodiment of the present invention, wireless energy transmission is realized by means of inductive energy transmission. This requires the use of magnetic alternating fields. For the magnetic field of the coil for closing the magneto-rheological clutch not being influenced thereby, the transmitter and receiver for inductive energy transmission are preferably axially spaced apart from the coil of the magneto-rheological clutch.

As an alternative, wireless energy transmission can also be realized by means of electromagnetic shafts.

Figure 2:
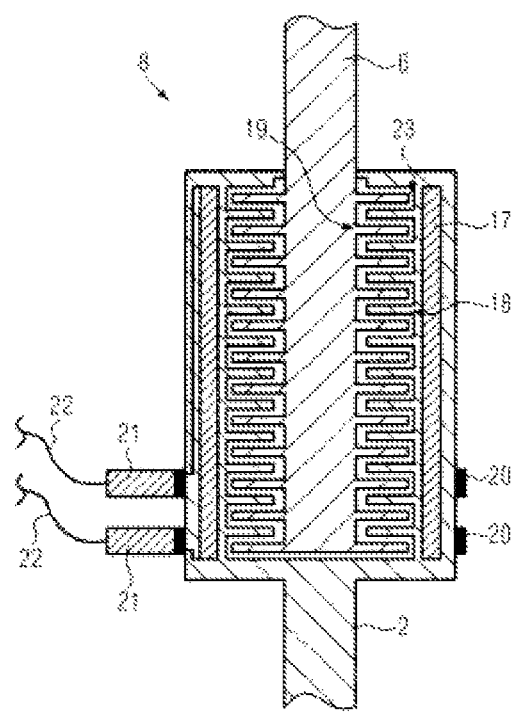
Figure 3:
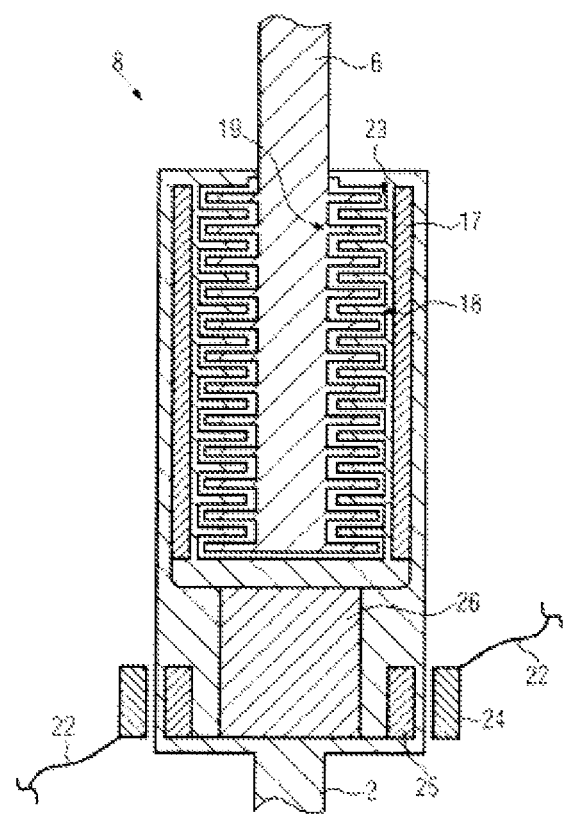
Figure 4:
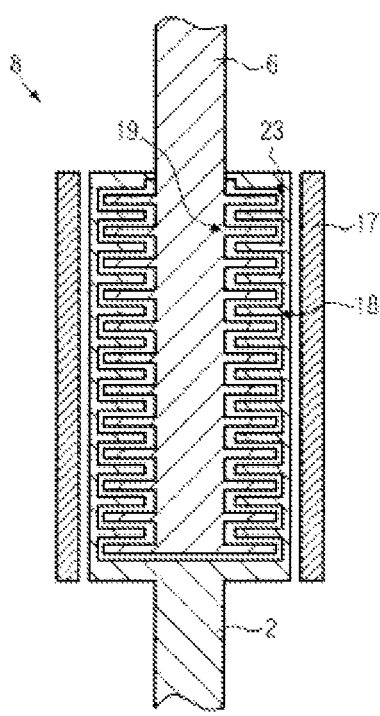

Embodiments of the present invention will be illustrated more in detail below with reference to drawings. In the drawings:

FIG. 1 shows a schematic diagonal view of a power transmission unit with motor according to the invention, FIG. 2 shows a longitudinal section through a magneto-rheological clutch employed in the power transmission unit according to the invention according to FIG. 1, FIG. 3 shows an alternative embodiment of a magneto-rheological clutch according to the invention in a longitudinal section, and FIG. 4 shows a further alternative embodiment of a magneto-rheological clutch in a longitudinal section.

In the following illustrations, equal parts are designated by equal reference numerals. If a figure contains reference numerals which are not explicitly discussed in the pertaining description of the figures, reference is made to previous descriptions of the figures.

FIG. 1 shows the schematic construction of a power transmission unit 1 according to the invention for an electromotively operated drive. The electric motor 10 of this drive is also represented. The power transmission unit 1 according to the invention essentially consists of two drive trains which each comprise one input shaft and one output shaft, wherein the input shaft and the output shaft can be coupled to each other by means of a magneto-rheological clutch. The first drive train consists of the first input shaft 2, the first magneto-rheological clutch 8 and the first output shaft 6. The second train comprises the second input shaft 3, the second magneto-rheological clutch 9 and the second output shaft 7. The two drive trains are arranged in parallel and spaced apart. A gear-wheel 14 firmly connected to the first input shaft 2 meshes with a gearwheel 15 also firmly connected to the second input shaft. Thus, a cylindrical gear is present between the first input shaft and the second input shaft which takes care that the first input shaft 2 and the second input shaft 3 always rotate in opposite directions. The gearwheels 14 and 15 have the same gear rim diameters, so that the first input shaft and the second input shaft rotate in opposite directions at the same rotational speed. The two input shafts 2 and 3 are driven by the electric motor 10. To this end, the motor shaft 4 of the electric motor 10 is engaged with the gearwheel of the first input shaft 2 via a pinion 16 firmly connected to it so as to entrain it. Here, too, a cylindrical gear is therefore present between the motor shaft 4 and the first input shaft 2.

The two output shafts 6 and 7 of the two drive trains also comprise each a gearwheel 12 or 13, respectively, firmly connected with the respective output shaft. In contrast to the two gearwheels 14 and 15 of the two input shafts, the two gearwheels 12 and 13 of the output shafts 6 and 7 do not mesh with each other but with the gearwheel 11 of the driven shaft 5 of the power transmission unit 1 according to the invention which is disposed between them.

Transmission between the motor shaft 4 and the driven shaft 5 is realized by the gearwheel 16 of the motor shaft having a smaller ring gear diameter than the gearwheel 14 of the first input shaft. Further transmission would be conceivable if the ring gear diameter of the gearwheel 11 of the driven shaft would be larger than the ring gear diameter of the gearwheel 12 of the first output shaft 6.

To achieve a compact design, the electric motor 10 of the drive is disposed next to the two drive trains and in parallel to the same. The housing in which the electric motor 10 is retained and the shafts 2, 3, 6, 7 and 5 are rotatably mounted is not represented in the schematic representation acc. to FIG. 1.

Below, the functioning of the drive or its power transmission unit according to the invention will be illustrated with reference to FIGS. 1 and 2. As already mentioned above, the two output shafts 6 and 7 of the two drive trains are not connected with the respective input shaft 2 and 3, respectively, in a torque-proof manner. There rather is a clutch between the input shaft and the output shaft, where only the closing of it leads to power transmission between the input shaft and the output shaft. According to the invention, the two magneto-rheological clutches 8 and 9 are employed for this. FIG. 2 shows a longitudinal section through the magneto-rheological clutch 8 of the first drive train. The construction of the second magneto-rheological clutch 9 is identical to the construction shown in FIG. 2. As can be taken from FIG. 2, the first input shaft 2 and the first output shaft 6 are arranged coaxially with respect to each other. As is well-known, in magneto-rheological clutches, each of the two shafts has a lamellar structure where the two lamellar structures engage each other. In this case, the lamellar structure 18 of the first input shaft 2 forms an external lamellar structure by which the inner lamellar structure 19 of the first output shaft 6 is enclosed. Between the lamellae of the two lamellar structures 18 and 19, there is a small gap in which the magneto-rheological liquid is located. The gap is designated with reference numeral 23 in FIG. 2. To be able to close the clutch 8, a magnetic field must be created by which the magneto-rheological liquid in the gap 23 is stiffened and thereby brings the two lamellar structures 18 and 19 in entraining engagement. For this, the coil 17 is provided which is part of the first input shaft 2 and directly radially encloses the two lamellar structures 18 and 19. To create the magnetic field, current is supplied to the coil 17. Since the coil 17 rotates along with the first input shaft 2, the current for this must be lead via a suited device from the stationary housing into the rotating shaft 2. Preferably, a sliding contact is employed for this. To this end, the first input shaft comprises at its outer periphery two sliding contact rings 20 which are in constant contact with the two sliding contact brushes 21. The two sliding contact brushes 21 are connected with a suited power source via supply lines 22.

If current is now supplied to the coil 17, the magneto-rheological clutch 8 closes, leading to the first input shaft 2 and the first output shaft 6 being connected in a torque-proof manner. As is represented in FIG. 1, the first input shaft and the first output shaft 6 thereby rotate counter clockwise as the motor shaft 4 rotates clockwise. By the engagement of the two gearwheels 12 and 11, the driven shaft 5 of the power transmission unit according to the invention rotates clockwise. Since the gearwheel 13 of the second output shaft 7 is engaged with the gearwheel 11 of the driven shaft 5, in this constellation, the second output shaft 7 rotates in a direction opposite to that of the second input shaft 3. Of course, this only works if the second magneto-rheological clutch 9 is opened. If, by suited action on the coils, the second magneto-rheological clutch 9 is closed and the first magneto-rheological clutch 8 is opened, the sense of rotation of the driven shaft 5 is reversed. By suited control of the two clutches 8 and 9, the driven shaft 5 can be decelerated or accelerated in both senses of rotation.

FIG. 3 shows an alternative embodiment of the magneto-rheological clutch 8 of FIG. 2, wherein the power supply of the coil 17 is here not realized by means of a sliding contact, but by means of wireless energy transmission. Wireless energy transmission is here inductive energy transmission. The first input shaft 2 to this end comprises an inner coil 25 which is radially enclosed by an outer coil 24. The coil 24 is firmly connected to the housing of the represented device. Between the outer coil 24 and the first input shaft 2, there is a small air gap, whereby, compared to the sliding contact, no frictional losses are generated. By the outer coil 24, an alternating magnetic field is created by means of a suited alternating voltage source whereby an alternating current is generated in the inner coil 25. By suited electronics 26 being part of the first input shaft 2, this alternating current is transferred to direct current which in turn is applied to the coil 17 of the magneto-rheological clutch 8.

FIG. 4 shows a further alternative embodiment of the magneto-rheological clutch 8 of FIG. 2. Here, the coil required for the creation of the magnetic field does not rotate together with one of the two shafts but is connected with the non-depicted stationary housing. This has the advantage that no current transmission from the stationary housing to one of the two rotating shafts must take place. Here, one can therefore do without a sliding contact or wireless energy transmission.

The invention claimed is:

1. Power transmission unit for an electromotively operated drive, wherein the power transmission unit comprises:
   a first input shaft and a second input shaft;
   a motor shaft for driving the first and the second input shafts together in opposite directions;
   a driven shaft for coupling, depending on a desired sense of rotation of the driven shaft, with the first or the second input shaft, and for engaging with a first output shaft and with a second output shaft;

a first magneto-rheological clutch between the first input shaft and the first output shaft for directly coupling the first output shaft with the first input shaft; and a second magneto-rheological clutch between the second input shaft and the second output shaft for directly coupling the second output shaft with the second input shaft;

wherein the first and the second magneto-rheological clutches each comprise:

one coil for creating a desired magnetic field, wherein a power supply of the coil includes means for wireless energy transmission between a sender connected to a stationary housing and a receiver with which the coil is to rotate.

2. Power transmission unit according to claim 1, wherein the first input shaft and the second input shaft are arranged in parallel with respect to each other, wherein the first output shaft is arranged coaxially to the first input shaft, and the second output shaft is arranged coaxially to the second input shaft.

3. Power transmission unit according to claim 2, comprising:

gearwheels for engagement of the driven shaft with the first and the second output shafts, wherein a gearwheel of the driven shaft is a spur gear which will simultaneously mesh with a gearwheel of the first output shaft and with a gearwheel of the second output shaft.

4. Power transmission unit according to claim 3, wherein a gearwheel of the first input shaft is a spur gear which will mesh with a gearwheel of the second input shaft, so that the first input shaft and the second input shaft rotate in opposite directions.

5. Power transmission unit according to claim 4, comprising:

a gearwheel of the motor shaft which will either engage with the gearwheel of the first input shaft or with the gearwheel of the second input shaft so as to be entrained.

6. Power transmission unit according to claim 3, comprising:

a step-up or a step-down gear realized between the motor shaft and the driven shaft by different gear rim diameters of engaged gearwheels.

7. Power transmission device according to claim 1, comprising:

means of inductive energy transmission for wireless energy transmission.

8. Power transmission device according to claim 7, comprising:

means for generating electromagnetic waves for wireless energy transmission.

9. Power transmission unit according to claim 1, comprising:

an actual value transmitter for detecting a position of the driven shaft.

10. Power transmission unit according to claim 1, comprising:

means for supplying coils of the magneto-rheological clutches with current to provide current control.

11. Power transmission unit according to claim 2, wherein a gearwheel of the first input shaft is a spur gear which will mesh with a gearwheel of the second input shaft, so that the first input shaft and the second input shaft rotate in opposite directions.

12. Power transmission unit according to claim 5, comprising:

a step-up or a step-down gear realized between the motor shaft and the driven shaft by different gear rim diameters of engaged gearwheels.

13. Power transmission unit according to claim 9, wherein the actual value transmitter is one of a shaft encoder, a speedometer or an accelerator.

* * * * *